US011222312B2

(12) United States Patent
Kassemi et al.

(10) Patent No.: US 11,222,312 B2
(45) Date of Patent: *Jan. 11, 2022

(54) METHOD AND SYSTEM FOR A SECURE REGISTRATION

(71) Applicant: SWOOP IP HOLDINGS LLC, Wilmington, DE (US)

(72) Inventors: James Kassemi, Albuquerque, NM (US); Lawrence Glen Holcomb, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/459,188

(22) Filed: Jul. 1, 2019

(65) Prior Publication Data

US 2019/0325402 A1    Oct. 24, 2019

Related U.S. Application Data

(63) Continuation of application No. 14/224,969, filed on Mar. 25, 2014, now Pat. No. 10,339,506.

(60) Provisional application No. 61/804,818, filed on Mar. 25, 2013.

(51) Int. Cl.
| | |
|---|---|
| *G06Q 20/12* | (2012.01) |
| *G06Q 20/02* | (2012.01) |
| *G06Q 20/08* | (2012.01) |
| *G06Q 20/32* | (2012.01) |
| *G06Q 20/38* | (2012.01) |

(52) U.S. Cl.
CPC ......... *G06Q 20/02* (2013.01); *G06Q 20/0855* (2013.01); *G06Q 20/12* (2013.01); *G06Q 20/322* (2013.01); *G06Q 20/388* (2013.01); *G06Q 20/3829* (2013.01); *G06Q 20/38215* (2013.01)

(58) Field of Classification Search
CPC .................................................... G06Q 20/401
USPC ........................................................... 705/50
See application file for complete search history.

(56) References Cited

U.S. PATENT DOCUMENTS

| | | | |
|---|---|---|---|
| 6,101,485 A | 8/2000 | Fortenberry et al. | |
| 6,970,852 B1 * | 11/2005 | Sendo ..................... | G06Q 20/12 380/255 |
| 7,194,437 B1 | 3/2007 | Britto et al. | |
| 8,494,958 B2 * | 7/2013 | Schoenberg ........... | G06Q 20/14 705/40 |
| 8,606,703 B1 | 12/2013 | Dorsey et al. | |
| 8,725,635 B2 | 5/2014 | Klein et al. | |

(Continued)

*Primary Examiner* — Chinedu C Agwumezie
(74) *Attorney, Agent, or Firm* — Volpe Koenig

(57) ABSTRACT

Methods and apparatus for secure registration to enable transactions between a first user and a vendor that is facilitated by a payment server are disclosed. The method may comprise storing a form soliciting customer information including a plurality of fields, wherein at least one of the plurality of fields is associated with an attribute. The method including receiving a copy of the form including customer data in all of the plurality of fields and transmitting a first subset of the customer data based on the attribute associated with the first subset of the customer data. The method including receiving a token in response to the transmission of the first subset of customer data and transmitting the token and a second subset of the customer data, wherein the second subset is based on the attribute associated with the second subset of customer data.

18 Claims, 7 Drawing Sheets

(56) References Cited

U.S. PATENT DOCUMENTS

| | | | |
|---|---|---|---|
| 8,762,272 B1 | 6/2014 | Cozens et al. | |
| 9,390,412 B2 * | 7/2016 | Weber | G06Q 20/3823 |
| 10,395,223 B2 | 8/2019 | Muthu et al. | |
| 10,515,345 B2 | 12/2019 | Koh et al. | |
| 2003/0028481 A1 * | 2/2003 | Flitcroft | G07F 19/00 |
| | | | 705/39 |
| 2009/0006233 A1 | 1/2009 | Chemtob | |
| 2010/0070419 A1 | 3/2010 | Vadhri | |

* cited by examiner

| First name | 301 | Last name | 302 |
|---|---|---|---|
| Email | 303 | | |
| Street | 304 | | |
| Street 2 | 305 | | |
| City | 306 | State 307 | Zip 308 |
| Country | 309 | 310 | |
| Phone | 311 | | |

| | |
|---|---|
| Amount | 312 |
| Referrer context | 313 |
| Card number | 314 |
| Card type | 315 |
| Exp month/exp year | 316 |
| CVC | 317 |
| Token | 318 |

FIG. 3

METHOD AND SYSTEM FOR A SECURE REGISTRATION

CROSS REFERENCE TO RELATED APPLICATION

This application is a continuation of U.S. patent application Ser. No. 14/224,969 filed Mar. 25, 2014, which claims the benefit of U.S. Provisional Application No. 61/804,818 filed Mar. 25, 2013, which are incorporated by reference as if fully set forth herein.

FIELD OF INVENTION

The present invention is related to e-commerce.

BACKGROUND

Until recently, most people shopped in local "brick and mortar" stores. As online shopping became a possibility, people were initially skeptical and felt uncomfortable providing personal information and credit cards to online vendors.

Security problems once thought to be a problem only for online vendors have become common place for "brick and mortar" stores as cyber criminals have breached customer information for "brick and mortar" stores. Meanwhile, online transactions are growing exponentially. Customer fears regarding the security of information when shopping is still present, and growing. As more and more sales are moving online, vendors are turning to different options to drive online sales. Some of these options include partnering with third parties to generate sales leads, send out email advertisements, and process financial transactions. However, others have created their own websites and may process their own transactions.

Many vendors turn to Software as a Service (SaaS), Platform as a Service (PaaS), Infrastructure as a Service (IaaS) or something similar. However, many of these offerings are lacking in security for the vendor and the customer. Additionally, vendors are typically uncomfortable with relying totally on outside companies for a vast part of their online presence. Methods and apparatus are desired for secure new card/user registration for customers, which can provide online vendors greater control.

SUMMARY

The methods and apparatus described herein allow a user to enter information for a web checkout, and for that data to be submitted to different services/applications in a secure manner. For example, protected financial information may be sent directly to a processor for specific sensitive information, without passing through the partner's servers. The partner is given a token and has the opportunity to charge the customer again in the future. This may be performed by leveraging JavaScript and the customer's browser, with no disruption to the user experience.

Methods and apparatus for secure registration to enable transactions between a first user and a vendor that is facilitated by a payment server are disclosed. The method may comprise storing a form soliciting customer information including a plurality of fields, wherein at least one of the plurality of fields is associated with an attribute. The method including receiving a copy of the form including customer data in all of the plurality of fields and transmitting a first subset of the customer data based on the attribute associated with the first subset of the customer data. The method including receiving a token in response to the transmission of the first subset of customer data and transmitting the token and a second subset of the customer data, wherein the second subset is based on the attribute associated with the second subset of customer data.

BRIEF DESCRIPTION OF THE DRAWINGS

A more detailed understanding may be had from the following description, given by way of example in conjunction with the accompanying drawings wherein:

FIG. 3 shows an example of a form used to facilitate secure new card/user registration;

DETAILED DESCRIPTION

When used herein, the term "token" may refer a sequence of byte data or string or file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce site may generate this token on behalf of the vendor.

As described in greater detail hereafter, the disclosed method and apparatus allow vendors the ability to "white label" the two-click flow by registering customers on their own website. A two-click may enable email recipients to make purchases in two clicks; one to select their purchase, the second to confirm the transaction. Similarly, they may be able to enable transactions via other electronic mediums. The financial transaction may be completed securely behind the scenes. This may allow vendors to remove the payment server's branding. Disclosed herein are processor-executable methods, computing systems, and related technologies for an automated application programming interface (API). The system and method may use an email server/account to complete an e-commerce transaction (e.g., for items/services/events/donations) for a transfer of funds from a customer to a vendor (e.g. retail site, charity, political organization or other vendor.) While the technologies are described herein using e-mail as an example, they may also be applicable to similar communication mediums, such as HTTP, SMS and MMS communication channels.

Figure 1:
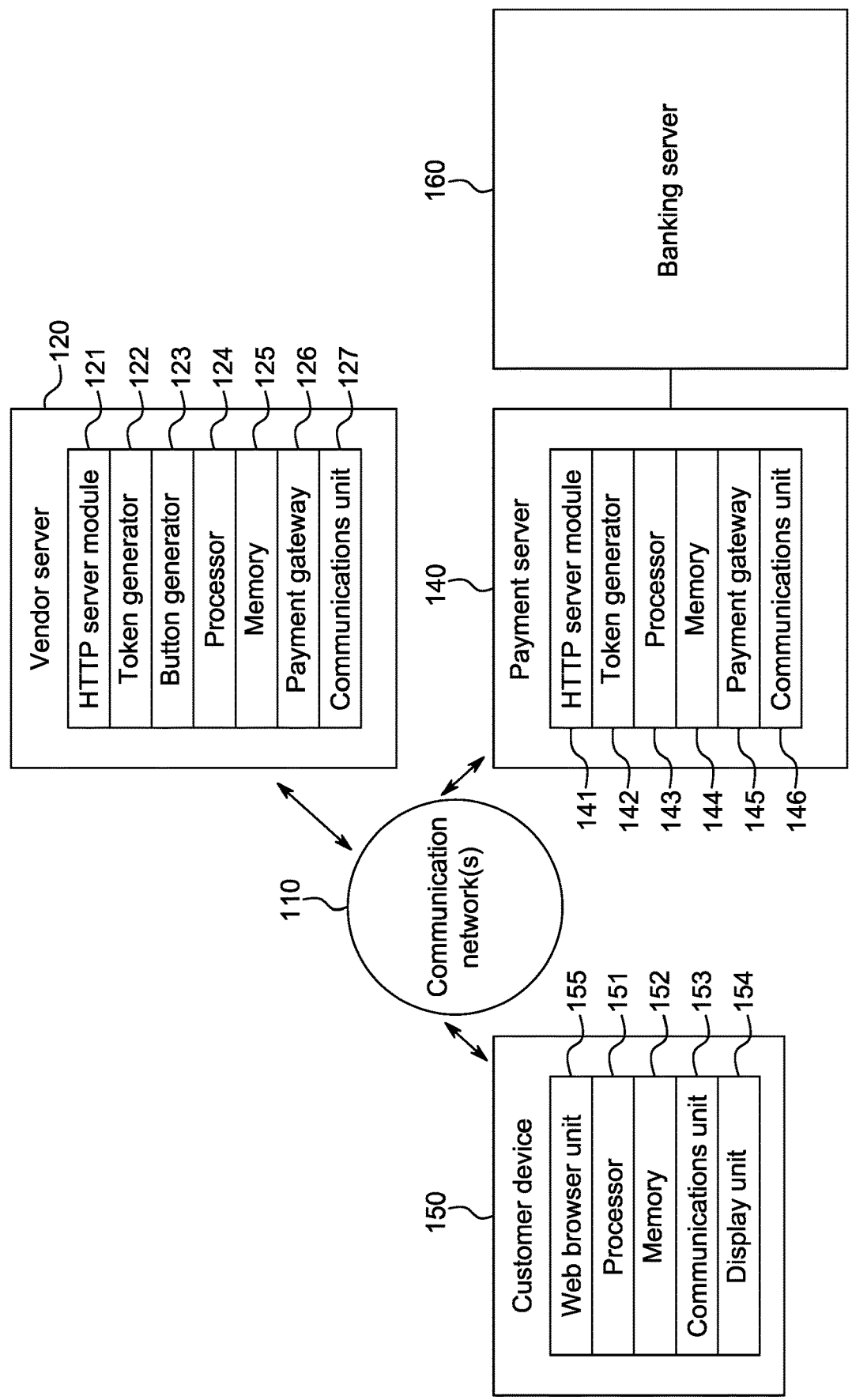
FIG. 1 shows an example system that may be used for a vendor token generator that may be used in e-commerce transactions.

FIG. 1 shows an example system 100 that may be utilized for email based financial transactions. The example system 100 includes a customer device 150, a vendor server 120, a payment server 140, and a banking server that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in or connected to the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, a token generator 122, a button generator 123, a processor 124, memory 125, a payment gateway 126 and a communications unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that directly connects with the payment processors, such as banking server 160 to handle the credit card data, and authorize credit card payments.

The token generator 122 may generate tokens for use in e-commerce transactions. Tokens may be encrypted sequence of data which contain information to perform a transaction when sent to the payment server(s) 140. Additionally or alternatively, a token may be one or multiple encrypted strings, files, passwords, cyphers or other data which may contain information used to perform or authenticate a transaction. A token may include one or more of the following parameters or other parameters not listed below:

a) private-key: The private key provided by the payment server 140.

b) public-key: Payment server's 140 public key, provided by the payment server 140.

c) partner-id: The partner ID provided by the payment server.

d) environment: The environment the vendor wants to generate buttons for. This distinguishes whether the token is being used in a testing environment or in the live environment (and running real transactions).

e) config: The path to a configuration file in yml format. This may hold a default set of information, e.g., private_key, public_key, partner_id, and other information—so they don't have to be entered separately each time a token is generated. The config field may also contain information specific to an offer (e.g. dollar amount) or a customer (like the card token) if multiple tokens are being generated with similar components.

f) type: The type of token to generate (site, email, universal). There are multiple types of tokens that a token generator may generate and decode. For example, site tokens may be used for website transactions, email tokens for two-click email payments, and universal tokens for email validations.

g) card: The card token associated with the recipient of this token. When a customer is registered with the payment server 140, the vendor receives a credit card token—a unique identifier that references the specific card associated with that customer and vendor. When the vendor is generating a token to submit to payment server 140, they may include the card token as a customer identifier.

h) email: The email associated with the receipt of this token.

i) URL: The Signup URL the recipient should go to if customer doesn't have payment information registered with payment server 140.

j) amount: The amount a user should be charged for the transaction the token is generated for.

k) user-data: Data to pass back as a reference. This data may include custom data that the vendor may want to pass through the payment server 140 and receive back when a transaction has completed. It may include an item reference number or SKU, customer address, or other piece of data that is not required by payment server 140 to complete a transaction, but that the vendor wants associated with that transaction.

l) expires: Expiration date for token, integer value of seconds since epoch.

m) header-user-agent: The HTTP_USER_AGENT from the request header. HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.

n) header-accept-language: The HTTP_ACCEPT_LANGUAGE from the request header. The accept-language is the acceptable language for the response—e.g. the language in which the web browser unit 155 is requesting the content be sent back.

o) header-accept-charset: The HTTP_ACCEPT_CHARSET from the request header. The accept-charset is the character sets that are acceptable for the response—e.g. the character set in which the web browser unit 155 is requesting the content be sent back.

p) ip-address: The IP address of the token recipient.

The token generator 122 may generate multiple types of tokens, e.g. email tokens, site tokens, and other tokens. Email tokens may be generated to facilitate two-click transactions that may be processed using email messages. These email tokens may be sent by a customer to an email processing system associated with the payment server 140 within the content of an incoming email. These email tokens may be sent to a customer device 150 including a mailto: link and a predefined body containing the token, which is often contained within a button graphic in an email. A vendor server 120 may generate just the token or the overall button graphic and content. Once the email token is received by the email processing system associated with the payment server 140, a number of validations may be performed, including a check to ensure that the email was sent by the user for which the token was created. A vendor server 120 may be prevented from charging a token by sending an email on behalf of a user.

Site tokens (or 'web tokens') allow users of a vendor server 120 website to complete a web-based transaction without requiring an email purchase. They may contain a short expiration time frame. A site token may not be used as an email token. The JavaScript SDK may be utilized to initiate a transaction with a site token The system 100 is designed to allow the vendor flexibility to offer deals for a limited time or number or responsive to available inventory. For example, the token may be configured to expire by default after two weeks, or any predetermined time, or never expire. The vendor server 120 may be configured to extend or shorten the expiration time of a particular offer associated with a token without resending an email or generating a new token. Also, the vendor server 120 may send email updates for an offer associated with a token. This may be predetermined, or may be later set, depending upon demand by customers. Additionally, the vendor server 120 may generate groups of token values that may automatically invalidate members of the group when one token is processed. This is useful when sending out multiple tokens via email to a single customer or when sending out tokens to multiple customers, but when the vendor wants only one or a predetermined number of tokens to be processed. Therefore when these predetermined numbers of tokens are used, the other tokens are invalidated, effectively rescinding the offered deal. The vendor server 120 may further be configured to send email notifications that the previously submitted token is now invalid.

The button generator 123 may create cross-client and cross-browser compatible buttons for e-commerce transactions. In one embodiment, the button generator 123 may include the token generator 122 to automatically generate an associated token for each button that is created. As discussed in greater below, the token generator 122 and button generator 123 may be configured to access an API that is stored in memory 125 and controlled by processor 124.

The vendor server 120 may communicate with the payment server 140 to provide information to the button generator 123 and the token generator 122. A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data.

The payment server 140 may include an HTTP server module 141, a token generator 142, a processor 143, memory 144, payment gateway 145 and a communications unit 146. While only one vendor server 120 is shown communicating with the payment server 140, this is shown as only an example but there may be many payment servers 140. Payment server 140 may communicate with multiple vendor servers 120. A customer, wishing to use the services of the payment server 140, may register his/her email address and payment information with the payment server 140. Similarly, vendors may register with the payment server 140. The payment server 140 may provide the vendor server 120 with a public key and private key to be used in token transaction in accordance with the methods described herein. When a transaction is attempted, the payment server 140 decodes the token, authenticates the sender of the email, and may process the transaction. While the payment server 140 is depicted as a separate entity in FIG. 1, this is shown as an example only. The payment server 140 may be controlled and/or co-located with the vendor server 120, and/or the banking server 160.

The banking server 160 may be controlled by a third party system bank. The payment server 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be a server for virtual currencies, such as BITCOIN, etc.

Figure 2:
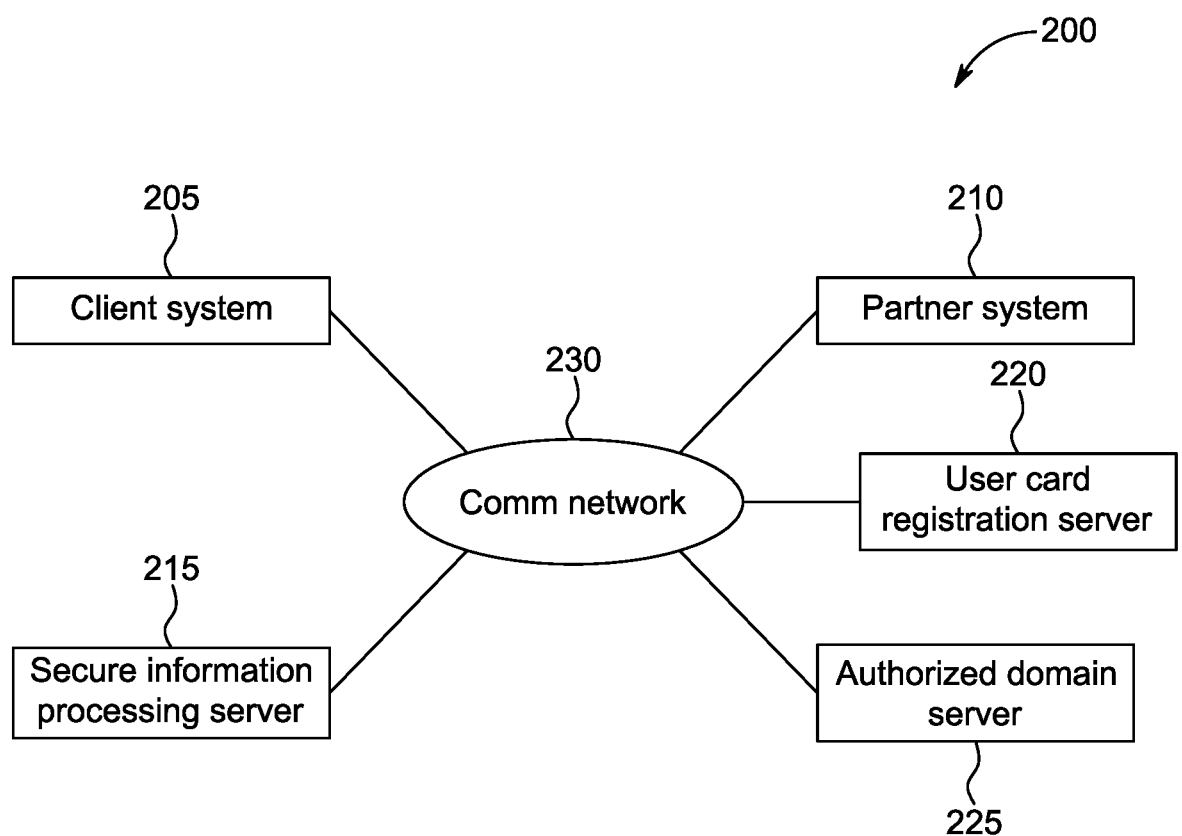
FIG. 2 shows another example system that may be utilized for secure new card/user registration for financial transactions.

FIG. 2 shows another example system 200 that may be utilized for secure new card/user registration for financial transactions. As shown in FIG. 2, a client system, or content host, may be configured to provide a content page, such as an HTML page rendered within an Internet browser. As an example, the client system 205 may comprise a customer device 150. The client system 205 may receive instructions from a website or an application to provide the user of the client system 205 with a form that prompts them for a combination of sensitive and non-sensitive information.

The system 200 may further comprise a partner system 210, which may be configured to serve as a third party host that generally delivers the form to the client system 205. The system 200 may further comprise a secure information processing server 215 configured to receive information over a communication network (e.g. over a sensitive channel), and configured to return a moderately sensitive return value representing the sensitive information, (e.g. an authorization token). The system 200 may further comprise a user/card registration server 220 configured to maintain an index of non-sensitive information as it corresponds to the authorization token values from the secure information processing server 215. The user/card registration server 220 is configured to return a value, also of moderate sensitivity that the client system 205 and the partner system 210 are trusted to possess (e.g. a card token and/or a member token). The system 200 may further comprise an authorized domain server 225 configured that may include a JavaScript module which may be able to parse received form data. The an authorized domain server 225 may include an authorized domain value and be configured to perform as the actual web domain where the client system 205 may request the input form that is shared between the partner system 210 and the user/card registration server 220. Each of these components may comprise a processor, memory, a display, and a user input device (not shown). And while these components are shown as separate entities they may be jointly located on one or more devices.

The client system 205 may be any client operation system (e.g. customer device 150). The client system 205 enables a user to request a secure new card/user registration. The client system 205 may be configured to load a file, e.g. a JavaScript file that solicits information. The client system 205 may gather sensitive information (e.g. customer information), the client system may use a function to receive as input a full set of data (or a reference to it that it may subsequently utilize to gather the sensitive data) that requires triage to the various components described in system 200. The client system 205 may categorize the information based on the sensitivity of the information. Each piece of customer information may have an attribute associated with it, wherein the attribute may indicate a level of sensitivity of the information. In one example, the attribute may be a tag or metadata associated with a field in the form.

The client system 205 may further be configured to remove a 'name' attribute of input elements in this form. For example, if the client information is entered on an HTML document, an HTML specification received by the client system 205 may indicate that a browser associated with the client system 205 should not submit data with predetermined attributes to the target of the form's action (e.g. a vendor). In another embodiment, the system 200 may be configured to remove this data from view of the target (e.g. vendor) of the form's action by registering document object model (DOM) event listeners. The system 200 may use these attributes to correctly route data to the proper recipient. This may allow a customer to register a credit card with a vendor server 120, without the vendor server 120 ever receiving the actual credit card information. As an example, the client system 205 may be configured to transmit subsets of the customer information to different entities, wherein the subset may be determined based on the attribute associated with a particular data field. For example, the client system 205 may be configured to transmit credit card information along with name information to a secure entity and only email and name information to a non-secure entity.

The client system 205 may receive communications, e.g. via a HTML based web page wherein behaviors may be specified all or in part by the markup on the input fields. The received form may specify that the input contains no "name" element, (wherein input may not to be delivered to the partner server (the action of the form post). The received form may specify that the input contains a data-protected attribute indicating that input is not to be delivered to the partner server, or to the user/card registration server. The data-protected attribute identifies data that should be delivered only to the secure information processing server. The form may further specify that the input contains a "data-atpay" attribute wherein this attribute indicates that the associated input may not to be delivered to the partner server, but it may be delivered to the secure information processing server and/or the user/card registration server. While these attributes are used as an example, the system may include any number of attributes that may be used to determine the security level of data.

The JavaScript function may be configured to parse the form and collect the data from each field input into the form. The JavaScript function may then load an HTML inline frame element from the user/card registration server, and populates fields in a form hosted that is hosted within the web page loaded from that server. This information may then be transferred to the HTML inline frame element (e.g. using a postMessage JavaScript method) enabling the system 200 to move the customer information from a form on one web host (e.g. a vendor server 120) to a form on another web host (e.g. payment server 140) while ensuring this information does not leave the client system 205 during the course of the transfer. After sensitive information is loaded into this form, the form is submitted (this process may be hidden from the user) directly to the secure information processing server 215. The secure information processing server 215 processor redirects the result of its process (e.g. an authorization token) to the user/card registration server 220, which stores this information and generates another token. This token is loaded into a response document that may inform the client system 205 of the token, e.g. using a postMessage JavaScript method. In one example, the JavaScript function may be performed via a combination of a static file server that sends the javascript content to the client system 205 (via a browser). The authorized domain server 225 may be configured to host the JavaScript information which the client system 205 may be configured to interpret.

The client system 205 may be configured to send this token directly to the partner system 210 for storage (e.g. using asynchronous JavaScript and XML (AJAX)) for storage, or the client system 205 may continue the original form submission.

The system 200 may be configured to remove elements marked as "data-protected" from the original form after the token is received, and replace them with a standard input with no new attributes designed to be posted directly to the partner system 210.

After receipt of this token, the JavaScript function may send the elements marked with "data-atpay" to the user/card registration server 220. The user/card registration server 220 may be configured to associate these fields with the token received from the secure information processing server 215.

After receipt of the card or member token, the client system 205 may then submit the form to the partner system 210, wherein the form may not include the sensitive information. The card token or member token may be used to generate keys to perform transactions and actions orchestrated by the user/card registration server 220.

The user/card registration server 220 may be configured to allow data transformation and redaction on the server receiving sensitive information and subsequent transfer of the redacted information to insecure servers and third party host(s). The user/card registration server 220 may be part of an API configured to enable an exchange of information between any business entity and a payment server 140. An API may run an entire transaction invoicing system, and may be applied to any email transaction technologies.

FIG. 3 shows an example of a form 300 used to facilitate secure new card/user registration. As described above, the form 300 may contain input fields 301-318 for non-sensitive information and sensitive information with no name attribute. These fields may not be visible to a user of a customer device 150 and may be preloaded into the form by an application or a web page. Fields with a data-atpay attribute may be required for card registration. The following input elements may include a data-atpay attribute with the value equal to the name below.

As shown in FIG. 3, input field 301 solicits the first name of the billing address associated with the card. Input field 302 solicits the last name of the billing address associated with the card. Input field 303 solicits an email address of the user associated with the card. Input field 304 solicits the street address associated with the card's billing address. Input field 305 solicits the second line of the street address associated with the card's billing address. Input field 306 solicits the city associated with the card's billing address. Input field 307 solicits the state associated with the card's billing address. Input field 308 solicits the five character postal code associated with the card's billing address. Input field 309 solicits the country associated with the customer. Input field 310 is a vendor configurable field allowing information that the vendor may want returned. Input field 311 solicits the phone number associated with the card's billing information. Input field 312 solicits the numeric value containing the amount for the initial charge. Input field 313 solicits any data that the vendor server 120 may want to pass through the payment server 140, e.g., auditing or some other tracking information. This value may also be returned in hooks preconfigured with the payment server 140. Input field 314 solicits the credit card number (this value may be data-protected). Input field 315 solicits the credit card type (this value may be data-protected). Input field 316 solicits the numeric two digit month representation of card expiration date and the four digit year representation of card expiration date). Input field 317 solicits the security code associated with the card (this value may be data-protected). Input field 317 solicits the token which may be required when updating an existing card. This value may be data-protected. If this value is present, changes may be applied to this card token, and a new token may not be generated. Often it may not be necessary to update a card, since creating a new token is functionally the same from a user's perspective.

The form 300 may contain input elements with name attributes for data that is required by both payment server 140 and the application designed by the vendor server 120. These fields may first be posted to the payment server 140 servers, and then returned to the vendor server 120 after the card registration process completes. Fields with the data-protected attribute may be removed from the form after card registration prior to form submission.

As described above, the form 300 enables the secure transmission of sensitive information allowing the registration of a customer, e.g., without transmission of the sensitive information to a vendor server 120.

In another example, the customer may be presented with a series of separate questions that solicit user input via a customer device 150. The customer may provide answers to each separate question, these answers may be individually associated with attributes. The cumulative answers to the series of questions may be transmitted to the proper entity in an email message, HTTP format, or other similar format. The receiving entity may be configured to parse the received information based on the received format. Additionally or alternatively, the system may be able to receive information via any website that requires an email to register. For example, the information requested in form 300 may be obtained via a customer's GOOGLE, FACEBOOK, PAYPAL, EBAY, AMAZON or other similar account. This may be obtained, for example, by using an API that allows access to account information.

Figure 4:
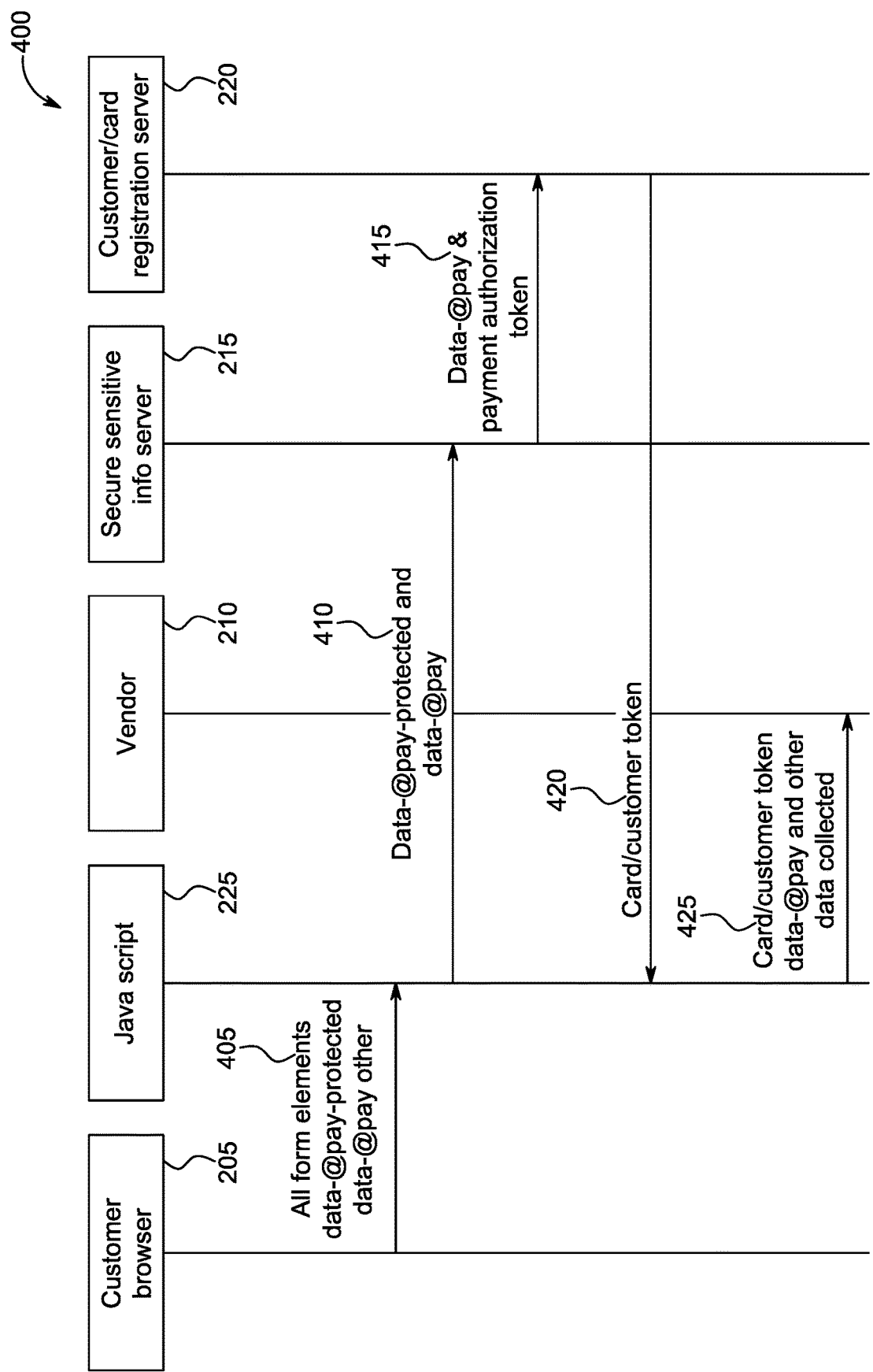
FIG. 4 shows a transactional diagram for a secure card/new user registration.

FIG. 4 shows a transactional diagram for a secure card/new user registration. A customer may use a browser associated with a client system 205 to access an electronic form. This form may be accessed on a website associated with a partner system 210, via an application associated with the client system 205 or any other similar electronic format. The electronic form may include multiple input fields, wherein one or more of the input fields may be associated with one or more attributes (e.g. data-protected). The attributes may be used to indicate to a receiving entity permissions for the associated data. Once the form is filled out with the required and optional data, the form is transmitted to the authorized domain server 225 (step 405). The authorized domain server 225 may be configured with functionality to receive and parse the form, for example, using JavaScript. The authorized domain server 225 may send a message to the secure information processing server 215 (step 410). This information may include information from the form that is associated with data-protected attributes as well as data-atpay attributes. This allows a customer to enter secure information and transmit it without sending it to the partner system 210. The secure information processing server 215 receives and decodes the received form and may generate an authentication token, this token along with data-atpay tagged information may be transmitted to the user/card registration server 220 (step 415). The user/card registration server 220 may respond by generating a customer token and/or card token and transmit it to the authorized domain server 225 (step 420). The authorized domain server 225 may then transmit the card and/or customer token and the data-atpay associated information along with unsecure information to the partner system 210 (step 425). As shown in the transaction, the customer's data-protected information is not shared with the partner system 210, however, the partner system 210 may be able to complete transactions using the token information.

Referring back to the example shown in FIG. 1, the system 100 may be configured to allow a vendor server 120 to add email checkout buttons to marketing messages using plug-in technology that may be configured to operate with the vendor server 120. Email checkout may be advantageous for businesses in encouraging sales on smartphones.

The vendor server 120 may receive access keys and credentials from the payment server 140. An API may be used to provide a gateway for the integration of two-click payment buttons in any HTML-formatted electronic communications to deliver payments to the customer device 150.

The vendor server 120 may be configured to use an API. The vendor server 120 may, using an API, initiate and complete a new user registration from within the vendor server's 120 website enabling the customer device 150 to complete two-click transactions. The vendor server 120 may be configured to generate for two-click payments with or without communication with the payment server 140. The vendor server 120 may be configured to execute a transaction via a web interface.

The payment server 140 may be configured to maintain an index of relationships between member records, credit cards, and email addresses. An OAuth 2.0 and JavaScript SDK 'connect' feature enables the vendor server 120 to charge a registered member without collecting credit card details by the vendor server 120.

The vendor server 120 may be configured to collect user credit card information on a website or application presented to the customer device 150 while using the above described methods to transmit the credit card information to the payment server 140 without passing it through the vendor server 120. The vendor server 120 and/or an application stored on the customer device 150 may maintain a credit card token enabling the vendor server 120 to charge that card in the future.

In some scenarios, the vendor may opt to collect only an email address from the customer device 150 and perform transactions via email. In this scenario, the payment server

140 may be configured to handle new user registration, card updates and transaction errors. To charge registered members' accounts directly from a vendor server 120 website, the vendor may collect the credit card information and receive or generate a credit card token. The vendor server 120 may request payment via email with any combination of a credit card token, an account identifier, or an email address. Alternatively, the vendor server 120 may be configured to charge registered members directly from a web site.

The payment server 140 may further be configured to register a URL with a hook system. Hooks provide a mechanism for notifying the vendor server 120 when an event occurs within the payment server 140. In response to a requested transaction, the payment server 140 may send the vendor server 120 signed requests with information about specific actions that have occurred on payment server 140. This information may include information regarding successful transactions, errors, the format of transmissions, and retries.

As an example, payment server 140 may operate the hook system, when an event occurs, such as a new transaction. The payment server 140 may transmit an HTTP POST request to the hook URL with details about the event. After the payment server 140 confirms the signature on a request, the vendor server 120 may parse the details and initiate custom actions.

An HTTP POST message associated with a vendor's hook may contain multiple parameters including: details and signature. Wherein a signature parameter may comprise a checksum representing the raw value of details. The details parameter may comprise a JavaScript Object Notation (JSON) string containing the event details. When a vendor server 120 receives hook information, the vendor server 120 may be configured to verify the signature of the message to the hook before taking action. This may allow the vendor server 120 to confirm that the message originated from the payment server 140. The payment server 140 may be configured to sign each hook request with a HMAC-SHA1 hash of the details parameter with the vendor's private key. If the payment server 140 does not receive a response to a hook (e.g. via a 200 HTTP response) after posting a message, the payment server 140 may be configured to retry a request at predetermined intervals (e.g. 2 m, 4 m etc.) until a timeout or alert period. If the payment server 140 does not receive a response after the timeout or alert period, an email alert is sent and the vendor may be contacted (e.g. by phone).

As described above, using the hook system, the payment server 140 may send the vendor server 120 signed requests with information about specific errors that may have occurred. These errors may include, but are not limited to the following: an email reserved by an existing registered member; an email is not registered by the payment server 140; a received email references a security key with a mismatched address; a security key has expired; an offer is attached to an expired security key; a key has already been processed; a key within the same group has already been processed; and/or an unanticipated execution exception has occurred. Examples of these errors are discussed in greater detail hereafter.

An "email reserved by an existing registered member" error may occur if an email is received by the payment server 140 containing an email token, but the email account that sent the message is not associated with the email address that the token requested. The payment server 140 may be configured to not process this transaction. This message is may be generated for email tokens created with the registered member record or email address. The vendor server 120 may be prompted to deliver a notification to the received address notify the registered member to update their account details with vendor server 120 application. The payment server 140 may be configured to send an email including the following parameters: Error, charge.failed, details, string—"Email reserved by an existing member", expected, the email address the payment server 140 expected to perform the transaction for, key, internal identifier for the failed token execution, received, and the email address payment server 140 received the email token from.

An "email is not registered by the payment server" error may occur if an email is received containing an email token, but the email account that sent the message is not associated with the email address that the token included. Additionally, the payment server 140 does not have any user account registered with this address. The vendor server 120 may be prompted to deliver a notification to the received address in order to notify the registered member to update their account details with vendor server 120 application. The payment server 140 may be configured to send an email including the following fields: Error, charge.failed, details, string—"Email is not registered", expected, the email address expected to perform the transaction for, key, internal identifier for the failed token execution, received, and the email address from which the email token was received.

An "email references security key with mismatched address" error may occur if an email is received containing an email token generated specifically for a credit card. The email the credit card was registered with does not match the email account that sent the message. The vendor server 120 may be prompted to deliver a notification to the received address notify the registered member to update their account details with vendor server 120 application. The payment server 140 may be configured to send an email including the following fields: error, charge.failed, details, string—"Email is not registered", expected, the email address the payment server 140 expected to perform the transaction for, key, internal identifier for the failed token execution, card, the card token that caused the failure, received, and the email address from which the payment server 140 received the email token.

A "security key expired" error may occur if the email or site token is accepted for processing, but the key is expired. The vendor server 120 may be configured to deliver notification to the email given in the details, and potentially send them an additional key. The payment server 140 may be configured to send an email based on the vendor's settings with the payment server 140. The email may comprise the following fields: error, charge.failed, details, string—"Security key expired", expired_at, date—the date the key expired, key, internal identifier for the failed token execution, email: email address associated with the key.

An "offer attached to security key expired" error may occur if an opportunity attachment to the email or site token has expired. This indicates that the attached blast or item is no longer valid. The vendor server 120 may be configured to deliver notification to the email given in the details, and potentially send them an additional key after resolving the invalid attachment issue. The payment server 140 may be configured to send an email including the following fields: error, charge.failed, details, string—"Offer attached to security key expired", key, internal identifier for the failed token execution, email:, email address associated with the key.

A "key has already been processed" error may occur if the email or site token has already been processed once. The vendor server 120 may be configured to deliver notification to the email given in the details, and potentially send them an additional key to try again. The payment server 140 may be configured to send an email including the following fields: error, charge.failed, details, string—"Key has already been processed", key, internal identifier for the failed token execution, email:, and email address associated with the key.

A "key with same group has already been processed" error may occur if an email or site token within the same token group as this email or site token has already been processed. All tokens are within a group are invalidated after one has been processed, even if there is an exception during processing. The vendor server 120 may be configured to deliver notification to the email given in the details, and send them an additional key to try again. The payment server 140 may be configured to send an email including the following fields: error, charge.failed, details, string—"Key with same group has already been processed", key, internal identifier for the failed token execution, email:, email address associated with the key, group:, and internal identifier for the group this key belonged to.

An "Unanticipated execution exception" error may occur if an email or site token failed to execute unexpectedly. This error results due to an internal exception thrown during processing at the payment server 140. The payment server 140 may send an email including the following fields: error, charge.failed, details, string—"Unanticipated execution exception", key, internal identifier for the failed token execution, email:, and email address associated with the key.

Transaction-specific events are simplified into two hook calls, one representing a sale, and one representing an update. Sale calls may require that the vendor server 120 create a new record on to track the transaction balance, and update calls indicate that the existing record be updated to reflect the new data. A transaction-specific event representing a sale may include the following parameters: type, charge.sale, transaction, unique reference identifier for the transaction, partner, unique reference identifier from the recipient of funds, balance, total amount of the transaction, in USD, unit_price, amount for one unit, in USD, quantity, number of units purchased, date, Unix timestamp of date transaction occurred, user, if a member is associated with the transaction, this is a unique member, identifier, card, if a card is associated with the transaction, this is the card token, email, email address of purchaser, name, and full name of purchaser. A transaction-specific event representing a sale may include the following parameters: type, and charge.update.

The authorized domain server 225 may comprise a JavaScript SDK that is configured to safely initiate transactions with site tokens, connect with existing registered member records and register and update credit card records. By managing the direction of input data, the functions available the system 100 may allow the vendor server 120 to collect sensitive information without passing it through the vendor server 120. Application integration may be simplified when some complex actions and authentication over multiple domains may be performed on the client-side. This SDK enables the transfer of secured data to the payment server 140 without it passing back through the vendor server 120, and enables credit card token creation and transactions to occur directly from the vendor server 120 website. The vendor server 120 after installing an SDK may set up a default configuration values for future method calls. The vendor server 120 may be configured to communicate the following parameters with the vendor server in one or more messages: partner_id and client_id.

For credit cards, the payment server 140 may receive a form parameter and a callback parameter. A form parameter may comprise the form element on a website that accepts card information, for example, as shown in FIG. 3. The callback parameter may comprise a function to call when the card registration fails or succeeds. When a card has been successfully processed, the vendor server 120 may receive the following information in the response argument associated with the callback parameter.

{token: "XYZ" card_mask: "### ##########1111", card_type: "001", expiration date: "2015-01-01", first_name: "First", last_name: "Last", email: "test@example.com", street: "100 Bill Rd", street2: null, city: "Albuquerque", state: "NM", zip: "87102", country: "US", phone: "5555555555", member_uuid: null, created_at: "2013-03-15T14:19:35-06:00", updated_at: "2013-03-15T14:19:35-06:00",}

On a transaction success, the vendor server 120 may receive a response object as an argument to the callback. The vendor server 120 may send a response to acknowledge acceptance of a transaction, but may then need to corroborate this transaction with a hook or the payment server 140.

If a transaction or card registration fails, the callback function may receive an object in the response argument with the error that occurred. The vendor server 120 may respond that the error is either 'ok', 'fatal', or 'error'. A fatal error indicates that the user should not attempt to commit the transaction again and should contact customer service for support. A regular 'error' indicates that the user should try to attempt the transaction again, using the attached messages as a guide to what needs correction. A general failure message may be displayed near the top of the form for the user that ran the transaction.

Specific errors for an attribute are mapped to the name given in the data-atpay attributes. The vendor server 120 may use this information to a form state by examining each of these keys.

Figure 5:
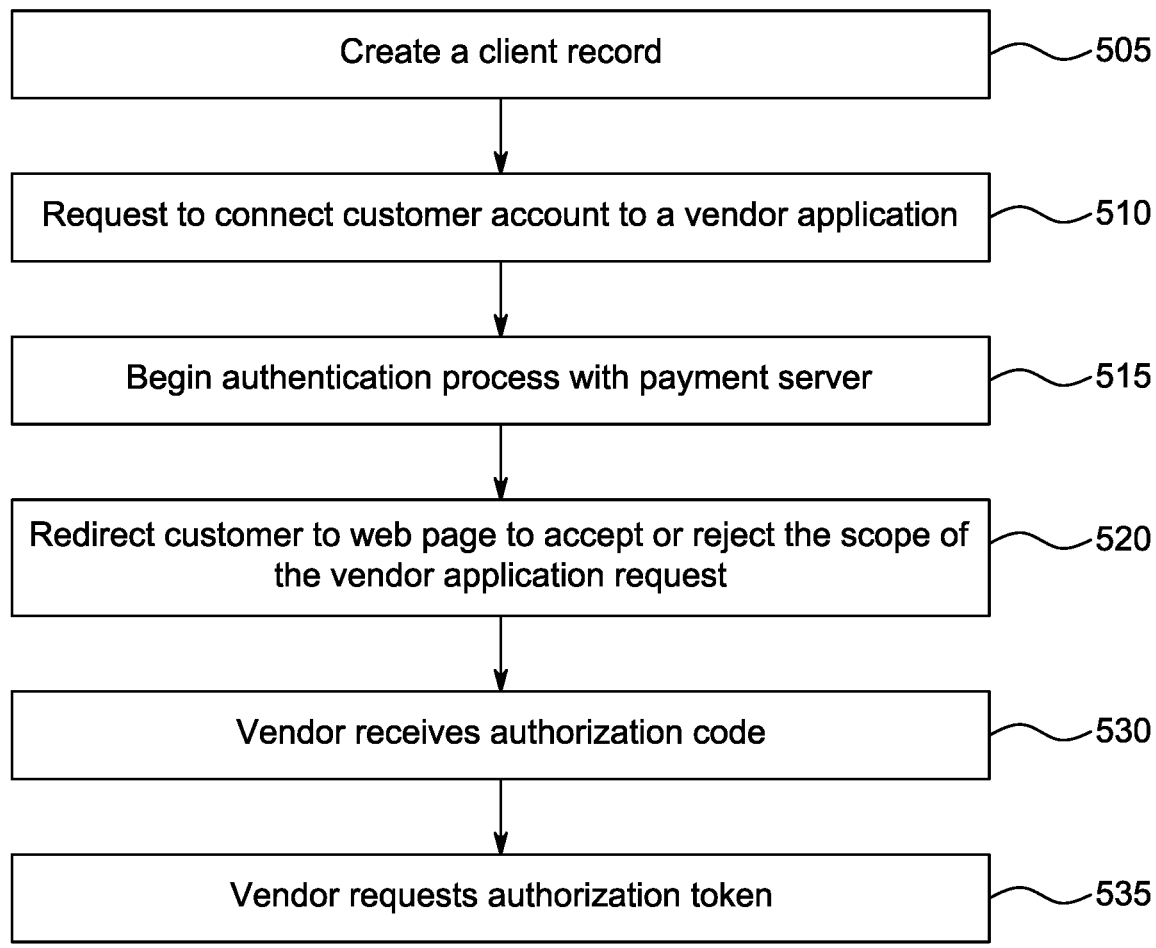
FIG. 5 shows an example of a basic work flow 500 for an application registration.

FIG. 5 shows an example of a basic work flow 500 for an application registration. During application registration, the vendor server 120 may use an application to create a 'Client' record on the system 100, granting it API access and identifying it with a pair of cryptographic signatures (step 505). Each vendor may create multiple 'Client' records for each environment the application runs under (i.e.: testing, staging, production), but each of these applications should be created in the appropriate API environment.

A registered member of the payment server 140 may connect their account to the application, granting it the ability to take action on their part over resources owned by the payment servers 140 (step 510). The vendor server 120 application may begin this authentication process by redirecting to the authorization endpoint with information about the 'Client' record ID (step 515).

If the registered member is not logged in on the payment server 140, the system 100 may generate a prompt log in. After successfully authenticating the registered member's credentials the customer device 150 may be redirected to another page on payment server 140 where registered member may accept or deny the vendor's application access to the scopes it has requested (step 520). After selecting an option, the registered member may be redirected back to the vendor server 120 (step 525). The vendor server 120 may receive an authorization code with the redirect (step 530). The vendor server 120 may request an authorization token with a code received from the payment server 140 in the redirect (step 535). This token may be used in subsequent requests by the vendor server 120 application to access the payment server 140 API endpoints.

The life of the token is not related to the session state of the user. The user may log in or out of the payment server 140 or the vendor application and not affect the usability of the token itself. The vendor may refresh a token when it expires, and handle invalid token requests with authorization on part of the user. The payment server 140 may send a token without an expiration date. If a registered member chooses to revoke the vendor server 120 application's permissions, then the vendor server 120 may need to refresh the token by reauthorizing the user.

In another example of authentication, an application associated with the vendor server 120 may be configured to direct a registered member to begin authentication. The vendor server 120 may initiate an OAuth Authorization request. Upon successful request the registered member may be redirected to a login page. After successful authentication the registered member may then be presented with the access scopes requested by the vendor server 120 application and the registered member may choose to accept or deny access. The registered member may then be redirected to a callback URI defined by the vendor server 120 with the results of their decision. The vendor server 120 may receive a code from the payment server 140 and the vendor server 120 may request an access token from the payment server 140 for subsequent requests.

The vendor server 120 may further request a key for two-click email payment processing. This feature enables a vendor server 120 to generate a key to be embedded in the body of an outgoing mailto: link message. A request for token may indicate the number and type of buttons requested, the amount, and an associated email. If the email address is associated with an existing account then the vendor server 120 may receive a payment token ("token") and an alternate URL ("url") the user may use to pay outside of email. If the email address is not associated with a registered account that may be indicated with a null value for "token".

The vendor server 120 may further be configured to request HTML snippets for payment buttons, which may be inserted directly into an HTML formatted email message. The API may be configured to respond with one of two button types for each provided email address: a "two-click button" or a "link button". An email in the list that is associated with an existing account may produce a "two-click button", while email addresses not known to a registered member may produce a "link button".

The vendor server 120 may further be configured to request encryption keys, which may comprise include a public and private key that may be used to generate web tokens and email tokens locally, such as with the Ruby client.

If a keyset is compromised, or a new keyset is needed, the vendor server 120 may request the deletion of keys. Tokens generated with the old keyset may no longer function.

Figure 6:
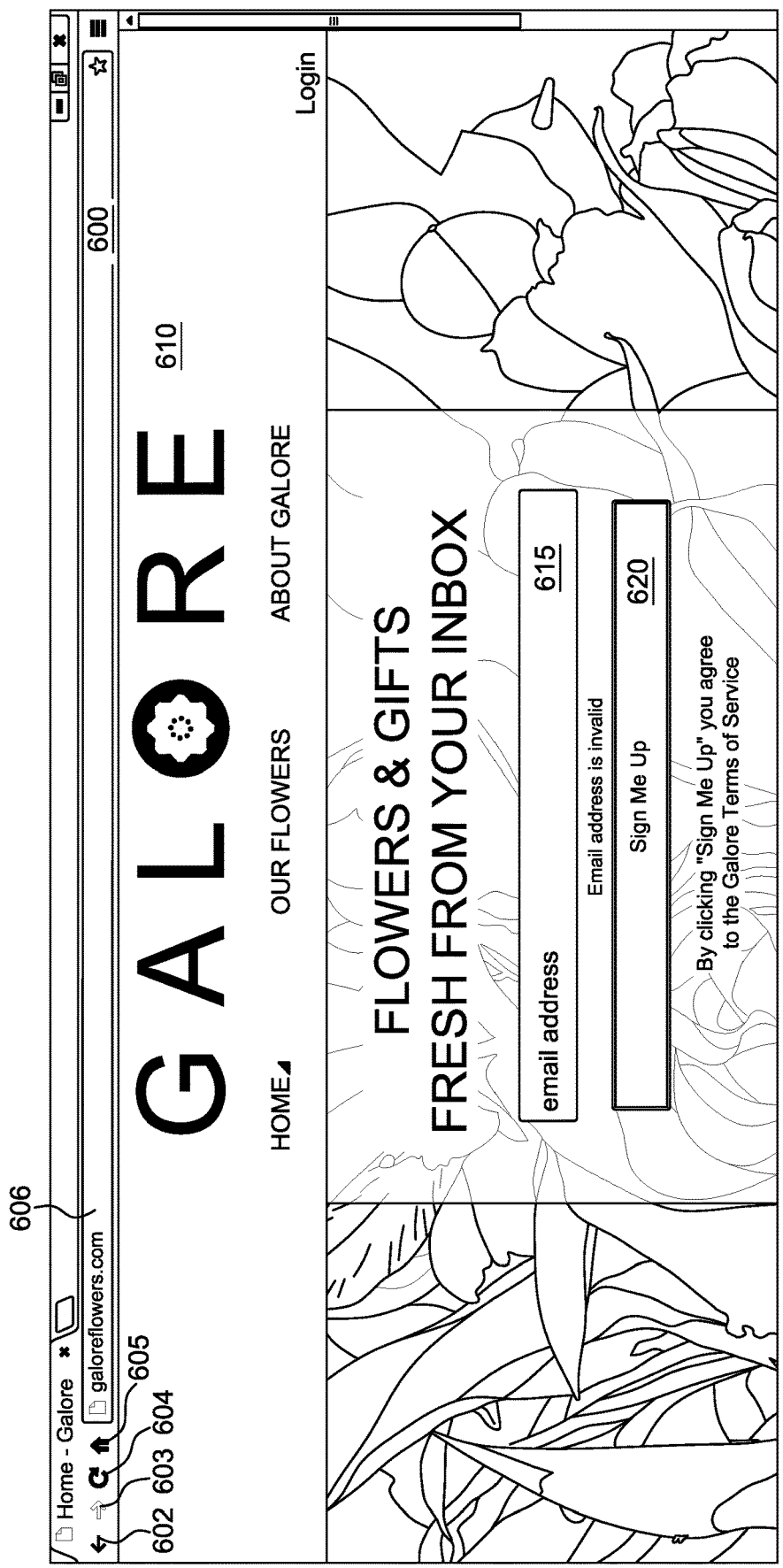
FIG. 6 shows an example of a vendor web page.
Figure 7:
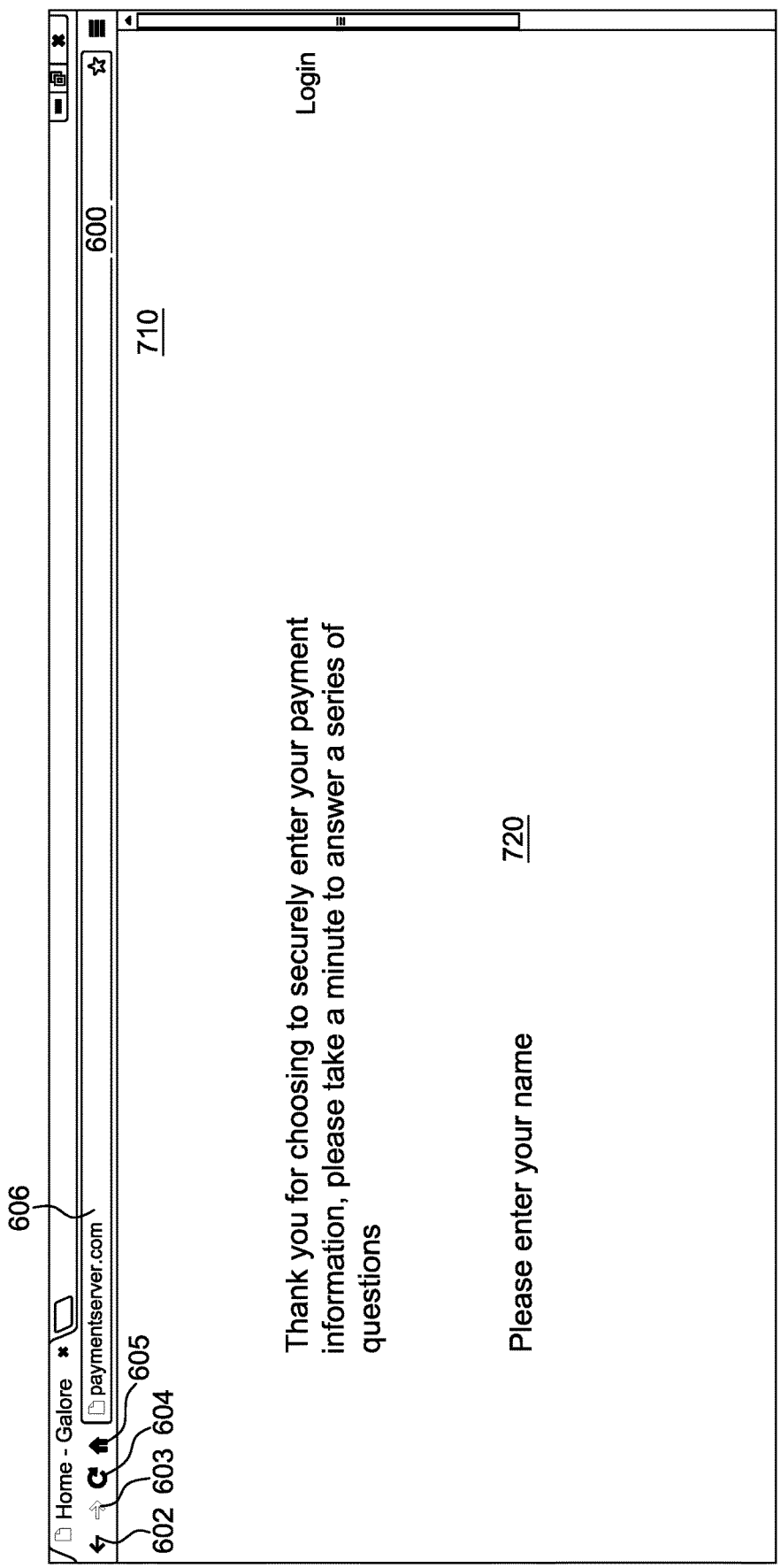
FIG. 7 shows an example of a web page for an URL Interface for web checkout.

FIGS. 6-7 show example web pages that may be displayed by the web browser unit 155 of the customer device 150. As will be described in detail below, the web pages may include display elements which allow the user of the customer device 150 to securely register a new user or credit card. The web pages may be included in a web browser window that is displayed and managed by the web browser unit 155. The web pages may include data received by the web browser unit 155 from the vendor server 120 and/or the payment server 140. The web pages may include payment transaction information.

The web browser window may include a control area 600 that includes a back button 602, forward button 603, refresh button 604, home button 605, and address field 606. The control area 600 may also include one or more additional control elements, such as bookmark page etc. The user of the customer device 150 may select the control elements in the control area 600. The selection may be performed, for example, by clicking a mouse or providing input via keyboard, touch screen, and/or other type of input device. When one of the control elements is selected, the web browser unit 155 may perform an action that corresponds to the selected element. For example, when the refresh button 604 is selected, the web browser unit 155 may refresh the page currently viewed in the web browser window.

FIG. 6 is an example web page 610 for accessing a vendor website. As shown in FIG. 6, the web page may include multiple input fields 615-620. A customer visiting the website may want to purchase goods or complete a transaction with the vendor. When the customer is ready, they may enter their email information into input field 615. By selecting input field 620, they may begin the registration process. As the customer device 150 receives input for the input fields 615-620, the web browser unit 155 may store one or more data structures that reflect the selections made in the input fields. Further, as the selections are updated, the web browser unit 155 may update the web page 610 to indicate additional, or more specific, questions that may be associated with the selections.

FIG. 7 is an example web page 710 for registering a new user or credit card information. As shown in FIG. 7, the web page may include an input field 720. After submitting information in web page 610, the customer may be redirected to web page 710. Web page 710 may be operated by the payment server 140 or another secure entity. The customer is prompted to enter in customer information. By entering information into input field 720, the user may begin providing customer data. As the customer device 150 receives input for the input fields 615-620, the web browser unit 155 may store one or more data structures that reflect the selections made in the input fields. As data is received, the web browser unit 155 may associate an attribute with each input. Further, as the selections are updated, the web browser unit 155 may update the web page 610 to indicate additional, or more specific, questions that may be associated with the selections. While FIG. 7 only shows a single questions, the customer may be presented with a series of questions on a series of pages or a list of questions on a page or any format used to solicit answers. This information may be collected and associated with the appropriate attributes and then sent to different entities based on the attributes as described herein. After entering the information, the customer may be redirected back to the vendor website. As another example, web browser 155 may be able to open web page 710 in a pop-up window, allowing the user to remain on the same vendor web page.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Bluray-Disc, or other type of device for electronic data storage.

Although the methods and features described above with reference to FIGS. 3-5 are described above as performed using the example system 100 of FIG. 1 or system 200 of FIG. 2, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-5 may be used alone without the other features and elements or in various combinations with or without other features and elements. Sub-elements of the methods and features described above with reference to FIGS. 1-5 may be performed in any arbitrary order (including concurrently), in any combination or sub-combination.

What is claimed is:

1. A method for improving security of an e-commerce system, the method comprising:
    receiving, by an authorized domain server, a message from a sender email address, wherein the message includes a first token and user data entered into a plurality of fields;
    validating, by the authorized domain server, a user based on the first token and the sender email address; and
    on a condition that the user is validated:
    transmitting, by the authorized domain server, a first subset of the user data to a secure information processing server,
    receiving, by the authorized domain server, a second token from the secure information processing server, wherein the second token is generated by the secure information processing server based on the first subset of the user data,
    authenticating, by the authorized domain server, the user based on the second token and the sender email address, and
    on a condition that the user is authenticated, transmitting, by the authorized domain server, the second token and a second subset of the user data to a third party server, wherein the second subset includes additional information not contained in the first subset.

2. The method of claim 1, wherein the first token is valid for a specified duration.

3. The method of claim 1, wherein the message is generated in response to a form soliciting user data, wherein the form soliciting user data includes the plurality of fields and the first token.

4. The method of claim 3, further comprising transmitting the form soliciting user data to a website operated by a third party.

5. The method of claim 3, wherein the form soliciting user data is sent as an email to the sender email address.

6. The method of claim 1, further comprising:
    on a condition that the user is not validated:
    sending a registration message to the sender email address.

7. A device for improving security of an e-commerce system, the device comprising:
    a communication interface that is communicatively coupled to a client device, a secure information processing server, and a third party server via a network;
    a processor that is communicatively coupled to the communication interface,
    wherein the processor is configured to:
    receive, using the communication interface, a message from a sender email address, wherein the message includes a first token and user data entered into a plurality of fields;
    validate a user based on the first token and the sender email address; and
    on a condition that the user is validated:
    transmit, using the communication interface, a first subset of the user data to the secure information processing server,
    receive, using the communication interface, a second token from the secure information processing server, wherein the second token is generated by the secure information processing server based on the first subset of the user data,
    authenticate the user based on the second token and the sender email address, and
    on a condition that the user is authenticated, transmits, using the communication interface, the second token and a second subset of the user data to the third party server, wherein the second subset includes additional information not contained in the first subset.

8. The device of claim 7, wherein the first token is valid for a specified duration.

9. The device of claim 8, wherein the message is generated in response to a form soliciting user data, wherein the form soliciting user data includes the plurality of fields and the first token.

10. The device of claim 9, wherein the processor is further configured to transmit, using the communication interface, the form soliciting user data to a website operated by a third party.

11. The device of claim 10, wherein the form soliciting user data is sent as an email to the sender email address.

12. The device of claim 7, wherein the processor is further configured to:
    on a condition that the user is not validated:
    send, using the communication interface, a registration message to the sender email address.

13. A non-transitory computer readable storage medium storing a program for improving security of an e-commerce system, the program when executed by a processor causes the processor to execute a method, the method comprising:
    receiving, using a communication interface that is communicatively coupled to the processor, a message from a sender email address, wherein the message includes a first token and user data entered into a plurality of fields;
    validating a user based on the first token and the sender email address; and
    on a condition that the user is validated:
    transmitting, using the communication interface, a first subset of the user data to a secure information processing server,
    receiving, using the communication interface, a second token from the secure information processing server, wherein the second token is generated by the secure information processing server based on the first subset of the user data,
    authenticating the user based on the second token and the sender email address, and
    on a condition that the user is authenticated, transmitting, using the communication interface, the second token and a second subset of the user data to a third party server, wherein the second subset includes additional information not contained in the first subset.

14. The non-transitory computer readable storage medium of claim 13, wherein the first token is valid for a specified duration.

15. The non-transitory computer readable storage medium of claim 13, wherein the message is generated in response to a form soliciting user data, wherein the form soliciting user data includes the plurality of fields and the first token.

16. The non-transitory computer readable storage medium of claim 15, wherein the method further comprises:
   transmitting, using the communication interface, the form soliciting user data to a website operated by a third party.

17. The non-transitory computer readable storage medium of claim 15, wherein the form soliciting user data is sent as an email to the sender email address.

18. The non-transitory computer readable storage medium of claim 13, wherein the method further comprises:
   on a condition that the user is not validated:
   sending, using the communication interface, a registration message to the sender email address.

* * * * *